United States Patent
Bheda et al.

(10) Patent No.: US 9,895,845 B2
(45) Date of Patent: Feb. 20, 2018

(54) METHOD AND A SYSTEM TO OPTIMIZE PRINTING PARAMETERS IN ADDITIVE MANUFACTURING PROCESS

(71) Applicant: Arevo, Inc., Santa Clara, CA (US)

(72) Inventors: Hemant Bheda, Saratoga, CA (US); Wiener Mondesir, Saratoga, CA (US); Riley Reese, Saratoga, CA (US); Shekar Mantha, Saratoga, CA (US)

(73) Assignee: AREVO INC., Santa Clara, CA (US)

( * ) Notice: Subject to any disclaimer, the term of this patent is extended or adjusted under 35 U.S.C. 154(b) by 280 days.

(21) Appl. No.: 14/623,471

(22) Filed: Feb. 16, 2015

(65) Prior Publication Data

US 2016/0236416 A1 Aug. 18, 2016

(51) Int. Cl.
| | |
|---|---|
| *G06F 19/00* | (2011.01) |
| *B22F 1/00* | (2006.01) |
| *B29C 67/00* | (2017.01) |
| *B33Y 50/02* | (2015.01) |
| *G05B 19/4099* | (2006.01) |

(52) U.S. Cl.
CPC .......... *B29C 67/0088* (2013.01); *B33Y 50/02* (2014.12); *G05B 19/4099* (2013.01); *G05B 2219/35134* (2013.01); *G05B 2219/49011* (2013.01); *Y02P 90/265* (2015.11)

(58) Field of Classification Search
CPC ...................................................... G06F 17/50
USPC ........................................................ 700/98
See application file for complete search history.

(56) References Cited

U.S. PATENT DOCUMENTS

| | | |
|---|---|---|
| 6,441,342 B1 | 8/2002 | Hsu |
| 7,024,272 B2 | 4/2006 | Thomas et al. |
| 7,483,818 B2 | 1/2009 | Amakai et al. |
| 8,308,876 B2 | 11/2012 | Woods et al. |
| 9,533,451 B2 | 1/2017 | Folgar et al. |
| 9,592,660 B2 | 3/2017 | Reese et al. |
| 9,595,037 B2 * | 3/2017 | Glasgow ............. B29C 67/0051 |

(Continued)

FOREIGN PATENT DOCUMENTS

| | | |
|---|---|---|
| EP | 3045992 A1 | 7/2016 |
| EP | 3051445 A1 | 8/2016 |

(Continued)

OTHER PUBLICATIONS

Wong et al, A Review of Additive Manufacturing, 2012, International Scholarly Research Network, pp. 11.*

(Continued)

*Primary Examiner* — Suresh Suryawanshi
(74) *Attorney, Agent, or Firm* — Wilson Sonsini Goodrich & Rosati (57) ABSTRACT

The present invention relates to a system and a method for optimizing printing parameters, such as slicing parameters and tool path instructions, for additive manufacturing. The present invention comprises a property analysis module that predicts and analyses properties of a filament object model, representing a constructed 3D object. The filament object model is generated based on the tool path instructions and user specified object properties. Analysis includes comparing the predicted filament object model properties with the user specified property requirements; and further modifying the printing parameters in order to meet the user specified property requirements.

24 Claims, 5 Drawing Sheets

(56) References Cited

U.S. PATENT DOCUMENTS

| | | |
|---|---|---|
| 9,656,429 B1 | 5/2017 | Mantha et al. |
| 2010/0312364 A1 | 12/2010 | Eryilmaz et al. |
| 2013/0101728 A1 | 4/2013 | Keremes et al. |
| 2013/0316081 A1 | 11/2013 | Kovalcik et al. |
| 2014/0232035 A1 | 8/2014 | Bheda |
| 2014/0277669 A1* | 9/2014 | Nardi ................. G05B 19/042 700/103 |
| 2014/0328963 A1 | 11/2014 | Mark et al. |
| 2014/0371895 A1 | 12/2014 | Sadusk et al. |
| 2015/0045928 A1* | 2/2015 | Perez ................. B29C 67/0088 700/110 |
| 2015/0052025 A1* | 2/2015 | Apsley ................ G06Q 30/0635 705/26.81 |
| 2015/0251356 A1 | 9/2015 | Batchelder et al. |
| 2015/0273583 A1 | 10/2015 | Bumgardner |
| 2015/0321422 A1 | 11/2015 | Boyer |
| 2015/0328839 A1* | 11/2015 | Willis ................. B29C 67/0088 700/98 |
| 2015/0331402 A1 | 11/2015 | Lin et al. |
| 2015/0336292 A1* | 11/2015 | Mikulak ................ B29B 9/06 428/402 |
| 2015/0360288 A1* | 12/2015 | Zalewski ............. B22F 3/1055 419/38 |
| 2016/0159012 A1 | 6/2016 | Lee et al. |
| 2016/0236279 A1* | 8/2016 | Ashton ................ B22F 3/1055 |
| 2016/0236414 A1* | 8/2016 | Reese ................. B29C 67/0088 |
| 2016/0236419 A1* | 8/2016 | Griffin ................ B32B 41/00 |
| 2016/0266573 A1 | 9/2016 | Bheda et al. |
| 2016/0271880 A1 | 9/2016 | Bheda et al. |
| 2016/0297142 A1 | 10/2016 | Bheda et al. |
| 2016/0297935 A1 | 10/2016 | Reese et al. |
| 2016/0332366 A1 | 11/2016 | Donovan |

FOREIGN PATENT DOCUMENTS

| | | |
|---|---|---|
| KR | 20130060144 A | 6/2013 |
| WO | WO-2015042422 A1 | 3/2015 |

OTHER PUBLICATIONS

Clausen, et al. Exploiting Additive Manufacturing Infill in Topology Optimization for Improved Buckling Load. Engineering 2.2 (2016): 250-257.

Co-pending U.S. Appl. No. 15/479,055, filed Apr. 4, 2017.

Notice of allowance dated Jan. 4, 2017 for U.S. Appl. No. 15/232,767.

Notice of allowance dated Apr. 27, 2017 for U.S. Appl. No. 15/232,767.

Office action dated Nov. 14, 2016 for U.S. Appl. No. 15/232,767.

Wu, et al. Infill Optimization for Additive Manufacturing—Approaching Bone-like Porous Structures. IEEE Transactions on Visualization and Computer Graphics (2017).

Office action dated Sep. 14, 2017 for U.S. Appl. No. 14/621,205.

International search report and written opinion dated Nov. 22, 2017 for PCT Application No. PCT/US2017/045986.

* cited by examiner

METHOD AND A SYSTEM TO OPTIMIZE PRINTING PARAMETERS IN ADDITIVE MANUFACTURING PROCESS

FIELD OF THE INVENTION

The present invention generally relates to additive manufacturing processes for production of 3D objects. In particular, the present invention relates to optimizing printing parameters of a three dimensional printing method using a property analysis module.

BACKGROUND

Additive manufacturing technologies use computer designs, such as CAD files, to generate three dimensional (3D) objects. The additive manufacturing, also known as 3D printing, usually comprises deposition, fusion, or formation of a material into sequential cross-sectional layers of the 3D object. One type of additive manufacturing, generally known as fused filament fabrication (FFF) involves a series of printed layers put together to construct a 3D object. The constructing material is extruded by an extruding head, also known as print head, of a 3D printer and is deposited layer by layer over a build plate to construct a 3D printed object.

The current 3D printing methods involve a slicing engine to produce a number of printable layers. Further, the slicing engine generates a tool path based on a set of slicing parameters. A controller provides the tool path to a printer/extruder that reads every layer and proceeds to create the object layer by layer.

Figure 1:
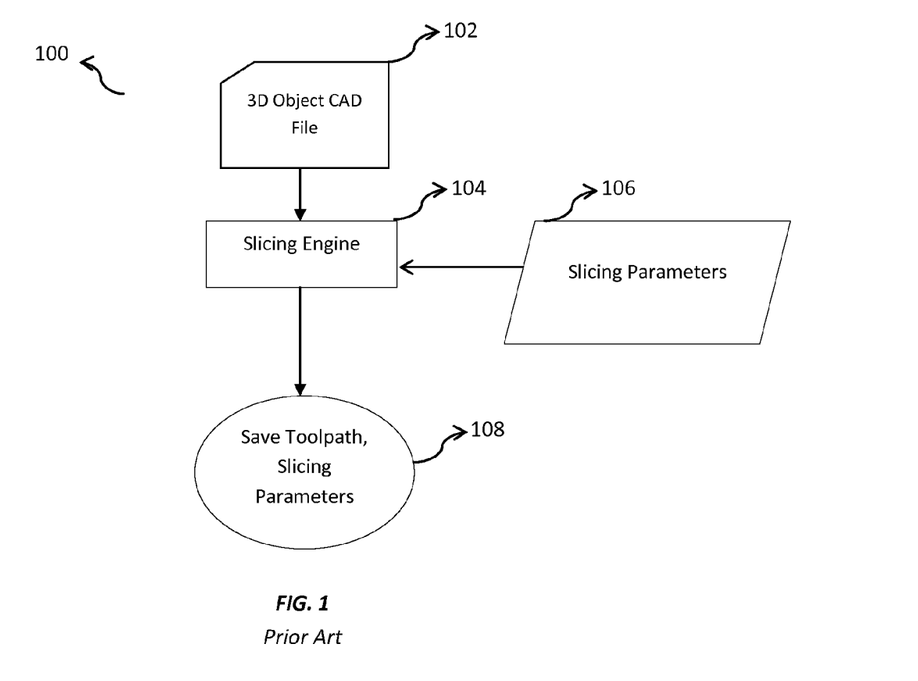
FIG. 1 illustrates a flow diagram depicting a conventional method used for 3D printing.

FIG. 1 shows a flow diagram (100) of a 3D printing method used in prior art. The method includes a slicing engine (104) to slice a 3D object CAD file (102) into a plurality of two dimensional layers considering a set of slicing parameters (106). The slicing parameters (106) are parameters defined according to user specifications for example, but not limited to, width and height of the printable layers, the number of layers to be printed for 3D object and the like. The slicing engine (104) slices the CAD file (102) representing a 3D object into slices along an XY-plane. Thereafter, the slicing engine (104) generates a tool path based on the two dimensional slicing.

FIG. 1 depicts prior art wherein slicing engine (104) based on user specified slicing parameters (106) generates tool path instructions to print a given object. These tool path instructions are saved in a storage device, and are used by a 3D printer to print the object. There are numerous ways to construct the same object, each with varying amount of weight, mechanical strength, EMI/ESD shielding, electrical conductivity, thermal conductivity, and other physical properties. Prior art does not pay any attention to these resulting properties while generating the tool path.

To highlight a specific example, there is a significant interest in the use of 3D printed parts in aerospace industry for light weighting. These parts need to be made as light as possible while meeting certain strength requirements. Another example involves the need for strong parts in Oil & Gas applications, which can be achieved by proper orientation of the tool path.

Therefore, there exists a need in additive manufacturing process to provide a slicing engine, which generates a tool path based on property analysis to construct optimized parts to meet weight, strength, thermal, and/or electrical requirements.

SUMMARY OF THE INVENTION

An embodiment of the present invention discloses a method for optimizing an additive manufacturing process, the method comprising: providing a first module, of a computing device, configured to: receive a data file defining a 3D conformation of a three dimensional object, said data file defines at least one specified property requirement of the three dimensional object; generate a set of print instructions, based on the data file and one or more slicing parameters; providing a second module, of the computing device, in communication with the first module, the second module configured to: constitute a filament object model of the three dimensional object using the set of print instructions; analyze the filament object model and compute at least one property of the filament object model; compare the properties of the filament object model with the specified property requirements of the three dimensional object; and instruct the first module to modify one or more slicing parameters, thereby modifying the print instructions, when there is at least one mismatch between the computed properties of the filament object model and the specified property requirements for the three dimensional object.

Another embodiment of the present invention discloses a system for optimizing an additive manufacturing process, the system comprising: a first module of a computing device configured to: receive a data file defining a 3D conformation of a three dimensional object, said data file defines at least one specified property requirement of the three dimensional object; generate a set of print instructions, based on the data file and one or more slicing parameters; and a second module of the computing device, in communication with the first module, configured to: analyze the filament object model and compute at least one property of the filament object model; compare the properties of the filament object model with the specified property requirements of the three dimensional object; and instruct the first module to modify one or more slicing parameters and print instructions, when there is at least one mismatch between the properties of the filament object model and the computed property requirements of the three dimensional object.

Another embodiment of the present invention discloses the second module that may be a property analysis module, such as a finite element analysis (FEA) module.

An objective of the present invention is to modify the slicing parameters based on the feedback of a property analysis, if computed object property of the 3D object model does not meet user specified set of property requirements.

A further objective of the present invention is to update type of print material if the slicing parameters cannot be adjusted to meet the user specified properties.

Another objective of the present invention is to specify use of multiple print materials necessary in required parts of the filament object model to meet the specified properties of the three dimensional object Another objective of the present invention is to save the optimum slicing parameters and tool path, if the computed object property of the 3D object model meets the user specified set of property requirements.

DETAILED DESCRIPTION OF THE EMBODIMENTS

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

The present invention discloses a system and a method for optimizing as well as updating a set of printing parameters, such as slicing parameters and tool path instructions, in additive manufacturing process. The system and the method of the present invention further aids in updating a filament object model based on the optimization of printing parameters. The optimization may be performed by a property analysis module utilized by the system, once the tool path instructions are generated by a first engine, such as a slicing engine, in the additive manufacturing. Therefore, the system and the method of the present invention optimize the printing parameters, and the filament object model before printing a three dimensional object.

Figure 2:
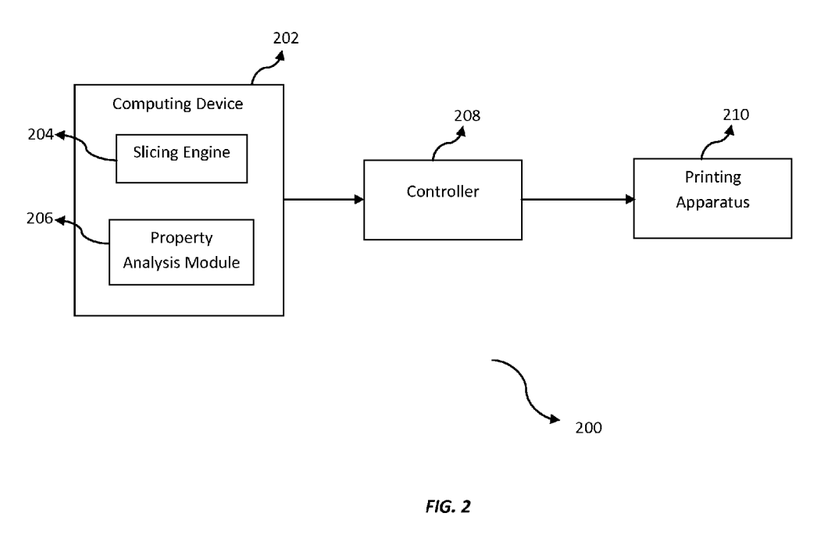
FIG. 2 illustrates a block diagram depicting a system, such as a system 200, for optimizing a set of printing parameters in additive manufacturing, in accordance with an embodiment of the invention

FIG. 2 illustrates a block diagram depicting a system, such as a system 200, for optimizing a set of printing parameters in additive manufacturing, in accordance with an embodiment of the invention. The system 200 may comprise a computing device (202) for inputting a user's requirements of a three dimensional (3D) object and further optimizing the printing parameters of the printing process. As shown in FIG. 2, the computing device 202 further includes a first module, such as a slicing engine 204 and a second module, such as a property analysis module 206. The slicing engine 204 may be utilized for discretizing a 3D representation of the 3D object and thereafter, generating a set of print instructions for a printing apparatus to print the 3D object, whereas the property analysis module 206 may be implemented for optimizing the printing parameters including the print instructions.

Further, the system 200 may comprise a controller 208 and a printing apparatus 210. The optimized printing parameters may be fed to the printing apparatus 210 via the controller 208 from the computing device 202. Therefore, the controller 208 may control the printing apparatus 210 for feeding the optimized print parameters and hence, printing the 3D object by implementing the print parameters.

In an embodiment, the computing device 202 may be a computer or a desktop that may be capable of downloading and running required software for functioning of slicing engine 204 and property analysis module 206. In another embodiment, the slicing engine 204 and the property analysis module 206 may be processors configured to implement software methods for performing their respective functions. In yet another embodiment, the computing device 202 may be built into the 3D printer. The software associated with the slicing engine 204 and the property analysis module 206 may be cloud-based and accessed on any number of computing devices, including but not limited to laptops, desktops, mobile phones, tablets, and 3D printers. In an embodiment, the property analysis module 206 may implement a property analyzing technique, such as a finite element analysis, for optimizing the printing parameters.

In a further embodiment, the printing apparatus 210 may include a print head or an extruder that implements the print instructions and extrudes a print material, such as a thermoplastic polymer, for printing the 3D object. In an embodiment, the system 200 may be utilized for optimizing the printing parameters of additive manufacturing processes, such as extrusion based, fused filament fabrication, droplet based, jetting methods and the like.

Figure 3:
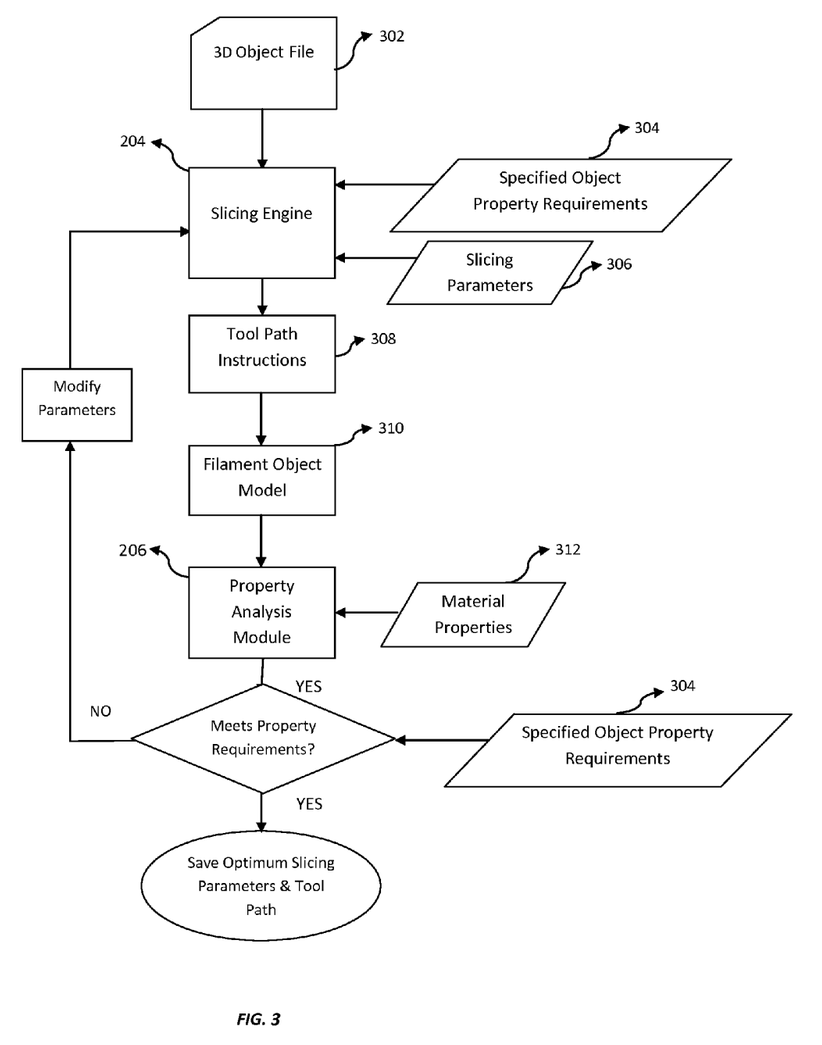
FIG. 3 is a block diagram illustrating information flow in a system (200) for optimizing a set of printing parameters, in accordance with an embodiment of the present invention.

FIG. 3 is a block diagram illustrating information flow in a system (200) for optimizing a set of printing parameters, in accordance with an embodiment of the present invention. A user may create a 3D object file 302, where the 3D object file 302 may be a file representing the 3D object, including geometrical features of the 3D object along with material property requirements. The user may input the 3D object file 302 specifying one or more user specified properties 304 for the construction of 3D object. The user specified set of properties 304 may include and are not limited to object material properties, object geometrical requirements, and the like. Object material properties may include but are not limited to mechanical, electrical, or thermal properties and the like. While, geometrical specifications may include dimensional tolerances around critical features, such as through holes, mating sections or aesthetical requirements, such as shape and configuration of the 3D object. The geometrical specifications are defined by parameters such as length, width, height, and the like. In an embodiment, the user specified properties 304 may specify absolute limits or ranges of the properties 304.

Further, the user may create the 3D object file 302 using a software program being run on the computing device 202; the software program may be such as AutoCad. Furthermore, in an embodiment, the 3D object file 302 may be a CAD file, an STL file, or the like. It may be obvious to a person skilled in the art that there may exist a variety of file formats in which a 3D object file 302 may be created.

According to the FIG. 3, the 3D file 302 may be fed to the slicing engine 204, where the slicing engine 204 discretizes the 3D file 302 into a plurality of segments aligned along a printing plane, based on a set of slicing parameters 306 and user specified object properties 304. In an embodiment, the slicing engine 204 slices the 3D file 302 into a number of printable layers aligned along two dimensional planes. The slicing parameters 306 are the parameters defined by the slicing engine 204 such as layer thickness, infill percentage, infill pattern, raster angle, build orientation, extrudate width, layer height, shell number, infill overlap, grid spacing and the like.

The slicing engine 204 discretizes the 3D file 302, and generates a set of print instructions, such as tool path instructions 308, based on the discretized segments of the 3D file 302. The slicing engine 204 communicates the set of tool path instructions 308 to the controller 208 that is in communication with the slicing engine 204. On receiving the tool path instructions 308, the controller 208 instructs a print head or an extruder of the printing apparatus 210 to follow the tool path instructions 308 and deposit print material for constructing the 3D object.

According to the present invention, the system 200 utilizes a module, such as a property analysis module 206, in conjunction with slicing engine 204 to optimize the slicing parameters 306 and hence, the tool path instructions 308. In an embodiment of the invention, a property analysis module, for example a finite element analysis (FEA) module may be implemented for optimizing the printing parameters. In an embodiment, the property analysis module 206 may also optimize a set of build parameters, such as temperature of build chamber, temperature of build platform, temperature of nozzle, and the like. The printed object's geometrical tolerances and material properties are dependent on the temperatures of the build chamber, build platform, and nozzle.

The following three examples are used to explain the dependency of the object's geometrical tolerances and material properties to the build temperatures. If the object is long/wide and/or has a high infill percentage, then the build platform and build chamber will need to be at a higher temperature to prevent warping at the corners of the object compared to a smaller/thinner and/or lower infill object. A smaller/thinner and/or lower infill object can be printed at a lower build platform temperature and build chamber temperature without warping at the corners. The lower build plate temperature allows for easier part dissociation after printing.

A second example of the effect of build temperatures involves mechanical strength. If the mechanical strength of an object needs to be high, the build chamber temperature also must be high to enhance interlayer adhesion and crystallinity. Although the higher chamber temperatures will improve z-directional strength, the geometrical accuracy and tolerance around edges and holes may not be as precise compared to lower chamber temperatures.

As a third example, the nozzle temperature directly affects the nozzle pressure, maximum feed rate, and material leakage. As the nozzle temperature increases, the pressure at the nozzle decreases and thus a greater amount of material can be extruded over time. Therefore, if an object needs to be constructed quickly, then a higher nozzle temperature may be required. At higher nozzle temperatures, the material has a lower melt flow. This leads to unwanted leakage of the material out of the nozzle during travel moves. If there is no time-constraint on the construction of the object, then the nozzle temperature should be at a minimum to reduce the amount of leakage. The above three examples illustrate the need for optimizing build temperature parameters through the use of property analysis and a slicing engine.

The property analysis module 206 along with the slicing engine 204 reconstitutes the 3D object into a filament object model 310 implementing the set of tool path instructions 308. The filament object model 310 comprises finite element blocks of a particular geometric shape such as a hexahedron or tetrahedron with known or defined properties (for example mechanical, electrical, thermal, etc.). These finite element blocks individually represent extrudate that is the print material being extruded from a nozzle of the print head during 3D object construction. The formation and alignment of the building blocks together represent the 3D object.

In an embodiment, the property analysis module 206 may include a database of material properties 312 for the print materials. The properties of the filament object model 310 may depend on the interactions of the finite element blocks, where the finite element blocks may possess inherent material properties 312 including anisotropic behavior of one or more selected print material. The interactions of the finite element blocks occur along the contacting, boundary layers of each building block.

The property analysis module 206 then analyzes the interactions of the finite element blocks to estimate one or more properties of the filament object model 310 that further may depict the properties of a constructed 3D printed object. Since the 3D printed object would be constituted of finite element blocks or individual filaments having different material properties in various direction, therefore, the material properties of the 3D printed object are anisotropic (different in the x, y, and z direction). The properties of the filament object model 310 may include and not limited to object material properties, such as mechanical, thermal and the like; and geometrical properties including shape and configuration of the 3D object defined by parameters such as length, width, height and the like. The estimated filament object model 310 properties may represent the properties of a constructed 3D object.

In an embodiment, the property analysis module 206 may analyze the interactions of finite element blocks, under specified user condition, such as applying objects loading profile using mechanical, electrical, and/or thermal stresses, to estimate the filament object model 310 properties.

After analyzing the interactions between finite element blocks, the property analysis module 206 compares the estimated properties of the filament object model 310 with the user specified properties 304, in order to verify whether the filament object model 310 has met the user specified properties 304 or lie within the limits specified by the user specified properties 304. In other words, the property analysis module 206 checks for any mismatch between the user specified properties 304 and the computed properties of the filament object model 310. Using this analysis, parts or areas of the filament object model 310 that do not meet the user specified properties 304 are identified. These areas are referred to as weak areas.

After identifying the weak areas, the property analysis module 206 provides a closed loop feedback control for optimizing the printing parameters, such as slicing parameters, material properties, support properties, printing speed, raft angle and the like, in order to avoid construction of weak areas in the 3D object or a weak object in whole. Therefore, in an embodiment, the property analysis module 206 directs the slicing engine 204 to modify one or more slicing parameters, such as raster angle, extrudate width, layer height, shell number, infill percentage, infill overlap, and the like, for the weak areas. Resultantly, the properties of the filament object model 310 may be brought within the limits proposed by the user specified properties 304 for the 3D object. Modifying the slicing parameters 306, in turn modifies the tool path instructions 308 that further updates the filament object model 310. In an embodiment, if the slicing parameters cannot be adjusted to meet the user specified properties, the property analysis module 206 may also adjust the type of build material to be used in the weak areas of the filament object model 310. This may include using a variety of print materials in order to impart specified properties where required in the filament object model.

The property analysis module 206 produces a number of potential filament object models by applying multiple iterations of the slicing parameters 306. Thereafter, property analysis module 206 subsequently analyzes each potential filament object model 310 for verifying one or more properties of the weak areas in comparison to the user specified properties 304.

Further, the property analysis module 206 determines optimum slicing parameters 306 and in turn, the tool path instructions 308 (and/or build parameters) that satisfy the requirements of the user specified properties 304. In this way, the system 200 effectively optimizes the slicing parameters 306 and updates the filament object model 310 till the properties in the weak areas are brought within the limits specified by the user specified properties 304.

Resultantly, the system 200 re-iterates the whole process of modification of the slicing parameters 306 using property analysis module 206 and updating the tool path instructions 308 until the filament object model 310 meets the user specified properties 304 and hence, provides optimized slicing parameters 306 and tool path instructions 308.

Figure 4:
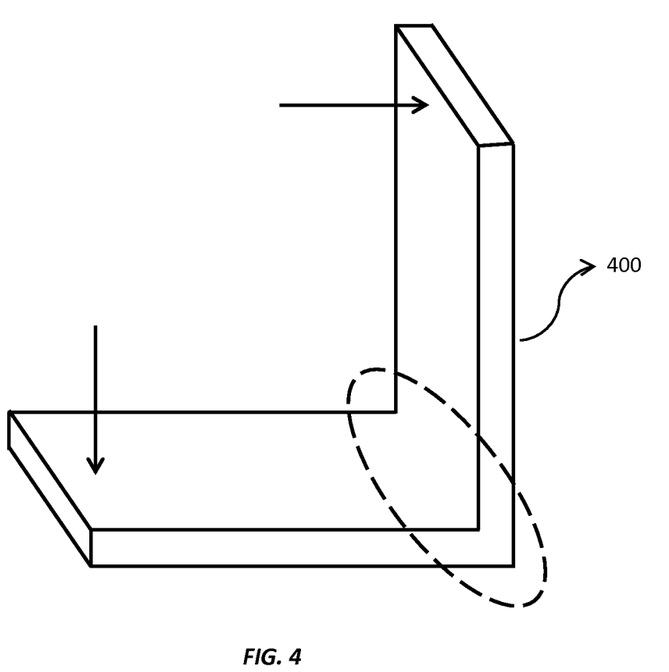
FIG. 4 illustrates a specific mechanical strength application of property analysis module that includes analyzing a simple bracket 400, in accordance with an embodiment of the present invention.

To illustrate a specific mechanical strength application of the property analysis module, a simple bracket 400 is analyzed (as shown in FIG. 4). Based on the loading profile shown using arrows in the object below, the structurally weak area is the bracket joint highlighted by the dotted circle. Assuming the joint falls below the user specified mechanical strength, the property analysis module 206 would identify the joint as a weak area of the object design and therefore would optimize the slicing parameters in this region. Extrudate properties, such as layer height, extrusion width, infill overlap, and grid spacing, would be optimized to maximize the density of polymer, the print material, in this region. Additionally, the property analysis module 206 would identify the optimal raster angle and build orientation, which in this example involves the tool path, spanning the joint running from the top of the bracket to the bottom left of the bracket. This type of raster angle and orientation would reduce the risk of layer separation when the object is loaded.

In another case, the bracket may meet the user specified mechanical strength, but may weigh too much. If the weight exceeds the user specified requirement, extrudate properties including raster angle, infill percentage, and infill pattern would be optimized to reduce the amount of print material used to construct the filament object model while still maintaining the user specified mechanical strength.

This brief example highlights only two material property applications of the present invention while considering only a few of the associated slicing parameters. The property analysis module 206 may also optimize thermal conductivity, electrical conductivity, EMI/ESD shielding, and the like by analyzing the effects of changes in print material, layer thickness, infill percentage, infill pattern, raster angle, build orientation, extrudate width, layer height, shell number, infill overlap, grid spacing and the like. All material requirements specified by the user are analyzed together to ensure the final object model meets or exceeds each of the object and material requirements.

On the other hand, if the filament object model 310 does not meet the user specified properties 304 even after multiple iterations of slicing parameters 306 and adjustments in the type of build material, the property analysis module 206 compiles a build report defining weak areas of the filament object model 310 design. Advantageously, the user may use the build report to reconstruct the object/part design around the weak areas and re-run the property analysis module 206. As a specific example, an object design of a device could include a mechanically weak thin section of the device that cannot meet the minimum tensile strength regardless of the slicing optimization and material selection. After the property analysis module 206 fails to meet the user specified tensile strength, a build report would be generated identifying this mechanically weak thin section as the limiting design factor. The user would then redesign the part, increasing the thickness of this section or providing additional support in this weak area to increase the mechanical strength of the design. The user can then run the updated design through the property analysis module 206 to optimize the slicing parameters and material property requirements for 3D printing.

Another embodiment of the present invention may provide a storage medium of the computing device 202, such as memory to save the optimal slicing parameters 306 and tool path instructions 308 (and/or build parameters) obtained in the present invention.

Figure 5:
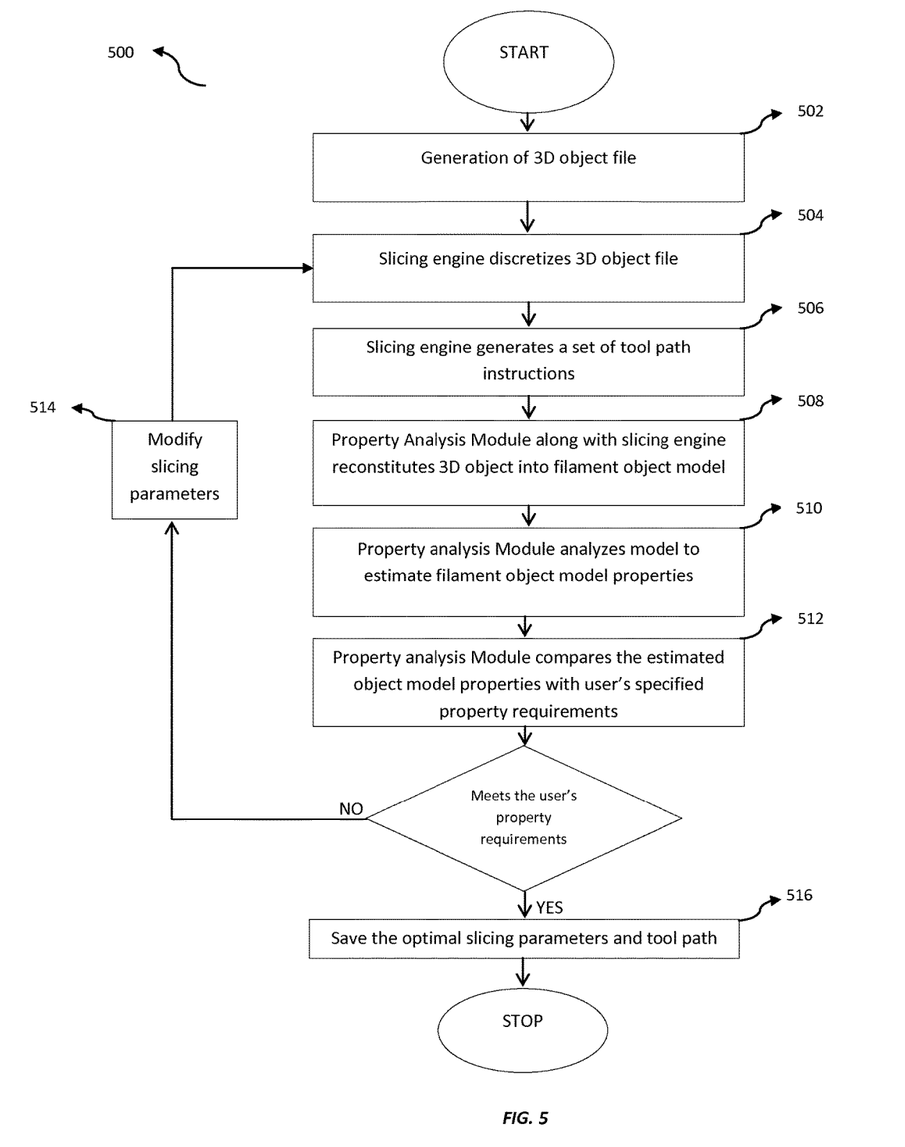
FIG. 5 is a flowchart illustrating a process to optimize a set of printing parameters in additive manufacturing, in accordance with an embodiment of the present invention.

FIG. 5 illustrates a flowchart depicting a process for optimizing a set of printing parameters in additive manufacturing, in accordance with an embodiment of the present invention. For printing a three dimensional object (3D) object, a user may create a 3D object file 302 representing the 3D object. The user may use a software program, running on a computing device 202, such as AutoCAD, for creating the 3D file 302. In an embodiment, the 3D object file 302 may be a CAD file, an STL file and the like. In an embodiment of the present invention, the computing device 202 may be a computer, a smart phone, a desktop, or any computing device that is capable of running the software program. Further, the 3D object file 302 may be a file defining one or more properties 304 of the 3D object, by the user. The user specified properties 304 may include and are not limited to geometrical properties of a 3D object along with object material properties. The geometrical properties may include but are not limited to shape and configuration of the object defined by length, width, height etc. of the 3D object and the like; and the object material properties may include but are not limited to mechanical, electrical, thermal, and the like.

Referring to FIG. 5, at step 502, the user generates the 3D object file 302 using the computing device 202. Further, at a next step 504, a first engine, such as a slicing engine 204, comprised in the computing device 202, discretizes the generated 3D object file 302 into a plurality of printable segments. The discretization of the 3D object file 302 is based on user's specified properties 304 including object material properties and geometrical specifications.

At step 506, after discretization of the 3D object file 302, the slicing engine 204 generates a set of print instructions, such as tool path instructions 308. The generation of tool path instructions 308 is based on the plurality of printable segments that are produced in the step 504.

Thereafter, at step 508, a second module comprised in the computing device 202, such as a property analysis module 206, along with the slicing engine 204 reconstitutes the 3D object into a filament object model 310, using the generated set of tool path instructions 308. The filament object model 310 comprises of one or more finite element blocks with known or defined properties (for example mechanical, electrical, thermal, etc.). These finite element blocks individually represent extrudate that further comprises the print material being extruded from a nozzle of the print head during 3D object construction. The formation and alignment of the building blocks together represent the 3D object. Since the 3D object would be constituted of finite element blocks or individual filaments having different material properties in various direction, therefore, the material properties of 3D printed object are anisotropic (different in the x, y, and z direction).

In an embodiment, the slicing engine 204 and the property analysis module 206 may be processors configured to implement software methods for performing their respective functions. In an embodiment, the property analysis module 206 may implement a property analyzing technique, such as a finite element analysis, for optimizing the printing parameters.

Further, in step 510, the property analysis module 206 analyzes the filament object model 310 that is generated at the step 508. At step 510, the property analysis module 206 analyzes the interactions between the individual filament blocks of the filament object model 310, since the properties of the filament object model 310 are dependent on the interactions of these blocks. Based on the analysis of the filament object model 310, the property analysis module 206 predicts one or more properties/properties for the filament object model 206 that in turn would represent the properties of a constructed 3D object. The estimated properties of the filament object model 310 may include geometrical properties specifying the shape and configuration of the 3D object defined by parameters such as length, width, height, and the like; and object material properties such as but not limited to mechanical, electrical, thermal, object weight, and the like.

In a succeeding step 512, the property analysis module 206 compares the estimated properties of the filament object model 310 with user specified properties 304. At this step, the property analyzing module 206 verifies the properties of the filament object model 310 to check whether they meet the user specified property requirements 304. In turn, in an embodiment, the property analyzing module 206 identifies those parts or areas in the filament object model 310 whose properties (material and/or geometrical) do not meet the user specified properties 304. Therefore, the property analysis module 206 identifies areas whose properties do not match or lie within the limits proposed by the user specified properties 304. These areas are referred to as weak areas.

Further, for the weak areas where the estimated properties do not meet the user specified properties 304, the property analysis module 206 instructs the slicing engine 204 to modify the slicing parameters 306 at step 514. This, in turn, modifies the set of tool path instructions 308 that further updates the filament object model 310. Therefore, the steps 504-512 are repeated by the property analysis module 206 until the user specified object properties are met. The present method 500 utilizes multiple iterations of the slicing parameters 306, till the properties (material and/or geometrical) of the filament object model 310 meet the user specified properties 304. Resultantly, the method 500 optimizes the slicing parameters 306 and in turn updates the tool path instructions 308 until the filament object model 310 meets the user specified properties 304.

On the other hand, in case the estimated properties of the filament object model 310 meet the user specified properties 304, the slicing parameters 306 and the set of tool path instruction 308 are saved in step 516. In an embodiment, the modified slicing parameters 306 and the updated tool path instructions 308 are saved in a storage module comprised in the computing device 202.

The property analysis module 206 used in the method 500 implements an analyzing technique for optimizing the printing parameters. In an embodiment of the present invention, the property analysis module 206 may implement a finite element analysis for analyzing and optimizing printing parameters, such as slicing parameters. In another embodiment, the property analysis module 206 may also modify a set of build parameters, such as temperatures of build chamber, build platform, and nozzle.

In an embodiment, if the filament object model 310 does not meet the user specified properties 304 even after multiple iterations of slicing parameters 306 and adjustments in the type of build material, the property analysis module 206 compiles a build report defining weak areas of the filament object model 310 design, after step 514. Advantageously, the user may use the build report to reconstruct the object/part design around the weak areas.

Advantageously, the present invention discloses a system and a method for efficiently optimizing printing parameters, such as slicing parameters and tool path instructions, in additive manufacturing. Further, the present inventions analyses a filament object model that represents a constructed 3D object and optimizes the slicing parameters based on the user's specified object properties.

Further, the present invention also helps in optimizing build parameters such as temperatures of build chamber, build platform, and nozzle.

We claim:

1. A method for optimizing an additive manufacturing process for generating a three-dimensional (3D) object using a 3D printer, the method comprising:
    (a) generating a set of print instructions based on a 3D conformation of the three dimensional object from a data file and one or more slicing parameters, wherein said data file defines at least one specified property requirement of said 3D object;
    (b) constituting a filament object model of the three dimensional object using the set of print instructions;
    (c) analyzing the filament object model and computing at least one property of the filament object model;
    (d) when there is at least one mismatch between the at least one property of the filament object model computed in (c) and the at least one specified property requirement of the three dimensional object, (i) generating a build report identifying one or more parts of the filament object model having the at least one mismatch between the at least one specified property requirement of the three dimensional object and the at least one property of the filament object model, and (ii) modifying the one or more slicing parameters, thereby modifying the print instructions; and
    (e) transmitting said print instructions for printing said 3D object using said 3D printer, wherein (a)-(d) are performed prior to printing said 3D object using said 3D printer.

2. The method of claim 1, further comprising reiterating (d) until the at least one property of the filament object model matches with the at least one specified property requirement of the three dimensional object.

3. The method of claim 1, further comprising updating a type of print material.

4. The method of claim 1, further comprising using multiple print materials to impart the at least one specified property requirement in required areas of the filament object model for constructing the three dimensional object.

5. The method of claim 1, further comprising updating the filament object model based on the slicing parameters and the print instructions.

6. The method of claim 1, further comprising saving the slicing parameters and the print instructions in a non-transitory storage module when the at least one property of the filament object model matches the at least one specified property requirement of the three dimensional object.

7. The method of claim 3, wherein the build report identifies one or more parts of the filament object model having a mismatch between the print material and the at least one specified property requirement of the three dimensional object.

8. The method as claimed in claim 1, wherein the slicing parameters include one or more parameters selected from the group consisting of filament diameter, layer thickness, infill percentage, infill pattern, raster angle, build orientation, extrudate width, layer height, shell number, infill overlap, and grid spacing.

9. The method of claim 1, wherein the at least one specified property requirement of the three dimensional object and the at least one property of the filament object model comprises geometrical properties defining shape and configuration of the 3D object and material properties.

10. The method of claim 1, further comprising, in (c), modifying one or more build parameters selected from the group consisting of temperature of build platform, temperature of build chamber, temperature of nozzle, raft properties, and object material properties.

11. A system for optimizing an additive manufacturing process for generating a three dimensional (3D) object using a 3D printer, the system comprising:
a computing device that is configured to:
(a) generate a set of print instructions based at least in part on a 3D conformation of the three dimensional object from a data file and one or more slicing parameters, wherein said data file defines at least one specified property requirement of said 3D object;
(b) constitute a filament object model of the three dimensional object using the set of print instructions;
(c) analyze the filament object model and compute at least one property of the filament object model;
(d) when there is at least one mismatch between the at least one property of the filament object model computed in (c) and the at least one specified property requirement of the three dimensional object, (i) generate a build report including one or more parts of the filament object model where there is mismatch between the at least one specified property requirement of the three dimensional object and the at least one property of the filament object model, and (ii) modify the one or more slicing parameters, thereby modifying the print instructions; and
(e) transmit said print instructions for printing said 3D object using said 3D printer, wherein said computing device is configured to perform (a)-(d) prior to printing said 3D object using said 3D printer.

12. The system of claim 11, wherein said computing device is further configured to reiterate modifying the slicing parameters and the print instructions until the at least one property of the filament object model matches the at least one specified property requirement of the three dimensional object.

13. The system of claim 11, wherein the computing device is further configured to update type of print material when the slicing parameters cannot be adjusted to meet the at least one specified property requirement.

14. The method of claim 11, wherein the computing device is further configured to specify use of multiple print materials necessary in required parts of the filament object model to meet the at least one specified property requirement of the three dimensional object.

15. The system of claim 11, wherein the computing device is further configured to update the filament object model based on the slicing parameters and the print instructions.

16. The system of claim 11, wherein said computing device further comprises a non-transitory storage module configured to save the slicing parameters and the set of print instructions when the at least one property of the filament object model matches the at least one specified property requirement of the three dimensional object.

17. The system of claim 11, wherein the slicing parameters include one or more parameters selected from the group consisting of filament diameter, layer thickness, infill percentage, infill pattern, raster angle, build orientation, extrudate width, layer height, shell number, infill overlap, and grid spacing.

18. The system of claim 11, wherein the at least one specified property requirement of the three dimensional object and the at least one property of the filament object model comprises geometrical properties defining shape and configuration of the 3D object and material properties.

19. The system of claim 11, wherein the computing device is further configured, in (c), to modify one or more build parameters selected from the group consisting of temperature of build platform, temperature of build chamber, temperature of nozzle, raft properties, and object material properties.

20. The method of claim 1, wherein the filament object model comprises finite element blocks corresponding to individual filaments for deposition from the 3D printer.

21. The method of claim 20, wherein the finite element blocks are generated for finite element analysis.

22. The system of claim 11, wherein the filament object model comprises finite element blocks corresponding to individual filaments for deposition from the 3D printer.

23. The system of claim 22, wherein the finite element blocks are generated for finite element analysis.

24. The method of claim 1, further comprising using said 3D printer to print said 3D object using said print instructions.

* * * * *

UNITED STATES PATENT AND TRADEMARK OFFICE
CERTIFICATE OF CORRECTION

| | | |
|---|---|---|
| PATENT NO. | : 9,895,845 B2 | Page 1 of 1 |
| APPLICATION NO. | : 14/623471 | |
| DATED | : February 20, 2018 | |
| INVENTOR(S) | : Hemant Bheda et al. | |

It is certified that error appears in the above-identified patent and that said Letters Patent is hereby corrected as shown below:

On the Title Page

Item (73), Assignee:
Replace "Arevo Inc." with --Arevo, Inc.--

In the Claims

Column 12, Line 2, Claim 13:
Replace "configured to update type of print material" with --configured to update a type of print material--

Signed and Sealed this
Twenty-ninth Day of May, 2018

Andrei Iancu
*Director of the United States Patent and Trademark Office*